United States Patent [19]

Smith

[11] 4,016,097
[45] Apr. 5, 1977

[54] PROCESS AND APPARATUS FOR FORMING SILICATE PRODUCTS

[75] Inventor: Fred Smith, Norwich, England

[73] Assignee: Anglian Water Authority, Huntingdon, England

[22] Filed: Oct. 22, 1975

[21] Appl. No.: 624,816

[52] U.S. Cl. .............................. 252/313 S; 210/47; 210/49; 423/329

[51] Int. Cl.² ......................................... B01J 13/00

[58] Field of Search ............... 252/313 S; 259/4 R, 259/18, 4 C, 19, 36, 37; 423/328, 329; 210/47, 49

[56] References Cited

UNITED STATES PATENTS

| 3,662,812 | 5/1972 | Godding | 259/18 X |
|---|---|---|---|
| 3,932,136 | 1/1976 | Stickney | 23/252 R X |

FOREIGN PATENTS OR APPLICATIONS

| 1,399,598 | 7/1975 | United Kingdom |
|---|---|---|
| 1,399,599 | 7/1975 | United Kingdom |

*Primary Examiner*—Benjamin R. Padgett
*Assistant Examiner*—E. Suzanne Parr
*Attorney, Agent, or Firm*—Lawrence Rosen; E. Janet Berry

[57] ABSTRACT

A process is disclosed in which a stable aqueous dispersion of a complex alkali metal-aluminium-silicate is prepared by mixing an aqueous solution of alkali metal silicate and an aqueous solution of an aluminium salt in a mixing tube and constraining the solutions to pass through the mixing tube in a generally helical path and under a pressure drop of at least 40 psi. Apparatus for carrying out the process is also disclosed.

12 Claims, 8 Drawing Figures

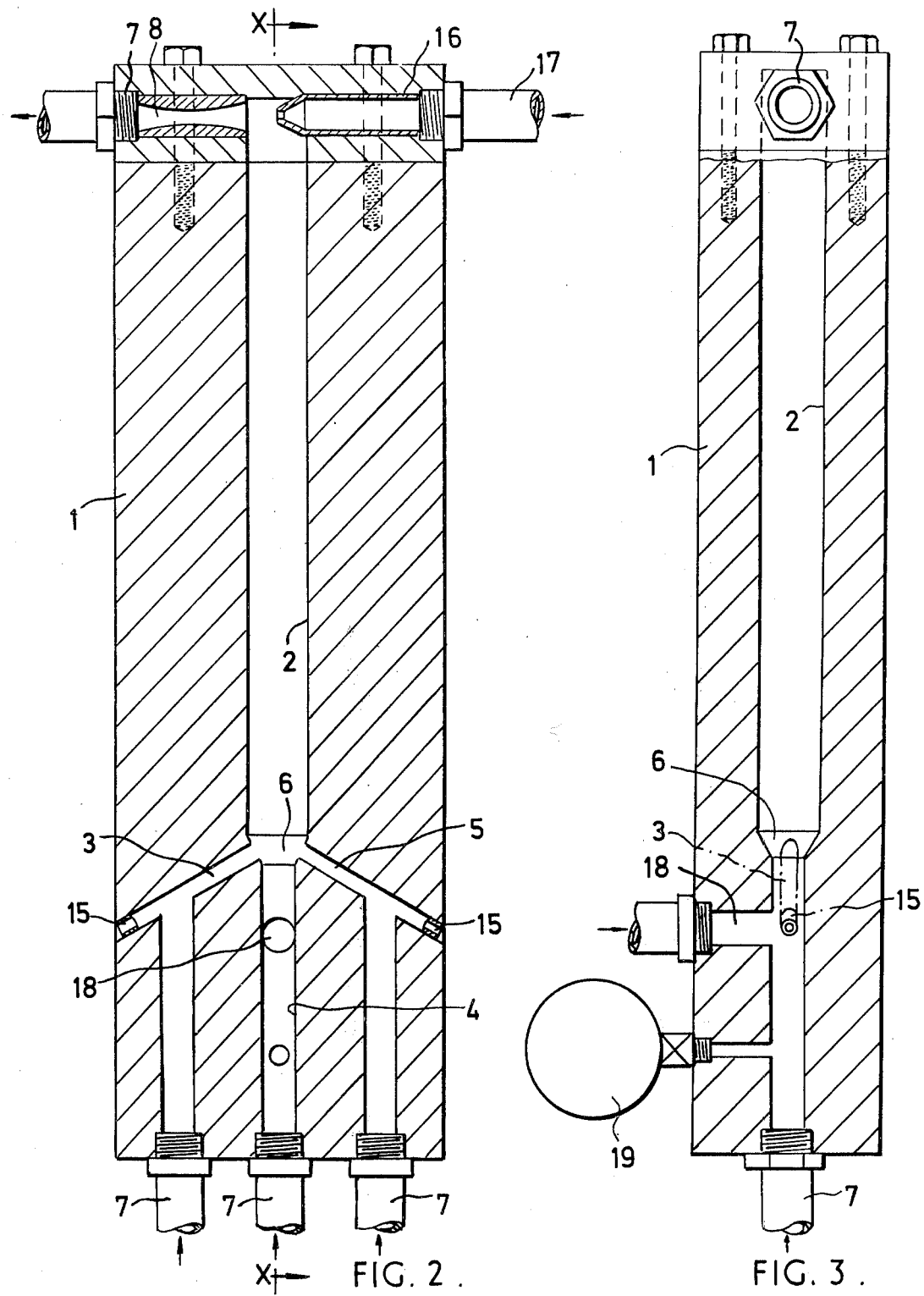

PROCESS AND APPARATUS FOR FORMING SILICATE PRODUCTS

We have described in our United States Patent Application Serial No. 549,273, filed Feb. 14, 1975 (now U.S. Pat. No. 3,963,640) how a complex alkali metal-aluminium-silicate material that is completely soluble in hydrochloric acid may be made by a process comprising mixing with high shear an aqueous solution of alkali metal silicate and an aqueous solution of an aluminium salt in such proportions and under such conditions that a complex alkali metal-aluminium-silicate polymeric material is formed substantially immediately upon contact of the solutions and is rendered into a stable dispersion in water.

Apparatus suitable for use in this method is described in that specification and also, in more detail, in United States Patent Application Ser. No. 262,379, filed June 13, 1972 (now U.S. Pat. No. 3,881,704). It comprises a mixing chamber, at least three separate inlets for liquids to the chamber, an outlet duct at a position distant from the inlets, an hydraulic ejector to which the outlet duct leads and means for mixing under high shear within the chamber the material introduced through the inlets. In practice the chamber is normally an upright vessel with the inlets leading into the bottom of it and the outlet leading out from it near its top and the means for applying high shear is close to the bottom of the vessel and generally comprises rotor blades and means for rotating the rotor blades at a speed greater than 1000 rpm.

This apparatus and the various controls associated with it for the flow of liquids, adjusting the speed of the rotors and so forth is capable of being operated with great precision to achieve very fine variations in the rate of throughput and composition of the product. It is accordingly very suitable in those instances where accurate control is essential, in particular when the product is being dosed direct into a municipal water supply to assist in the purification of that supply. However, there are many instances, for example in the purification of sewage and industrial effluents, where such great accuracy in control is not really necessary and instead it would be adequate if a simpler apparatus, and in particular one that did not have to be machined to such fine limits and involve such high rotation speeds, could be used. Ideally we would have an apparatus that can be devoid of moving parts and yet can be used for achieving the shear necessary for carrying out the process of U.S. Pat. No. 3,963,640 when mixing water, aluminium sulphate and sodium silicate.

According to a first aspect of the present invention, a process is provided in which a stable aqueous dispersion of a complex alkali metal-aluminium-silicate having a pH of 3 to 7.5, which contains up to 5% silicate, measured as $SiO_2$, and which is soluble in hydrochloric acid, is prepared by mixing an aqueous solution of alkali metal silicate and an aqueous solution of an aluminium salt in apparatus comprising a mixing tube, at least two inlets through which aqueous streams can pass into one end of the tube, and an outlet at the other end of the tube, the process being characterised in that the bulk of the water is supplied to the tube through one inlet, the aqueous solution of alkali metal silicate is supplied through another inlet, the aqueous streams from each inlet are constrained to pass in a generally helical path along the tube by stationary means positioned in the tube, and the aqueous dispersion is removed through the outlet at a pressure which is at least 40 psi lower than the pressure at the inlet through which the bulk of the water is supplied.

Usually the aqueous dispersion is removed through the outlet at, or below, substantially atmospheric pressure, and the pressure of the bulk of the water at the inlet is at least 40 psi. Generally the pressure difference between the inlet and the outlet is at least 60 psi and often more that 80 psi.

The product is preferably removed through the outlet under the influence of an hydraulic ejector. Thus often the pressure at the outlet will be at least 10 in. Hg and more often at least 10 e.g. 20 psi vacuum. The water which is introduced through the hydraulic ejector will dilute the silicate complex and this may be desirable if the product is to be used directly in the treatment of water supplies. In this way the volume of water introduced through the inlets can be minimised to the amount necessary to form a stable dispersion before any further dilution.

The helical motion to which the aqueous streams are subjected in the process of this invention necessarily involves some degree of entrainment of the streams with one another and approximates to the effect achieved by having rotors moving at very high speed, as in U.S. Pat. No. 3,963,640. Factors such as the length and cross-sectional area of the tube, the pressure drop along the tube, and the number of helical turns which the stationary means constrain the aqueous streams to perform, influence the degree of mixing of the alkali metal silicate and aluminium salt. It is important that the stationary means should not be such that they simply cause shear at the interfaces of the adjacent streams, as would be the case if a single unbroken helical strip, or thin baffles whose faces are absolutely parallel to the flow, were provided in the tube. Conversely, the stationary means should not be such that mixing takes place without any shear. Thus mere positioning of baffles randomly along the tube transverse to the length of the tube, for instance as in an open launder, would not be satisfactory because the flow would not be helical but would rather, figuratively, be zigzag. Similarly, when aqueous streams of alkali metal silicate and of an aluminium salt are injected perpendicularly into a mixing tube and onto the stream of the bulk of the water without any means being provided for constraining the various streams to maintain some laminar characteristics and to entrain each other, again the results would not be satisfactory. It is easy to observe whether or not the necessary helical entrainment, mixing and shear is being conducted, since if it is not an acid soluble product in the form of a stable dispersion is not obtained. Instead silica or other insoluble material will precipitate out either immediately or on standing.

If the apparatus only has two inlets the silicate solution goes through one of them and the bulk of the water and the aluminium salt solution goes through the other, this other inlet having a greater diameter than the inlet for the silicate. Preferably, however, the aluminium salt solution is fed through an inlet separate from the inlet for the bulk of the water and so the apparatus preferably has three inlets.

The bulk of the water must be delivered under pressure, and usually the other stream or streams are as well. The bulk of the water is generally delivered through an inlet pipe that has a diameter at least as great as the diameter of the or each of the other inlet pipes, and often one and a half or even two times the diameter of the other pipe or pipes.

In order to facilitate making the streams pass in a general helical path and entrain each other without substantial initial mixing, it is preferred that the inlet pipes are all at an angle of more than 120° to the mixing tube. When there are three inlet pipes it is preferred that two should be at an angle of more than 120°, e.g. about 135°, and the third should be at 180°, i.e., having a common axis with the mixing tube. Preferably the inlet pipe and the mixing tube are in a common plane.

In one embodiment of the present invention, the inlet pipe for the bulk of the water terminates in a slot-shaped orifice through which a sheet of water (and sometimes aluminium salt) is discharged. The sheet, and therefore the orifice used to form it, is preferably annular. The annular slot is preferably defined by, externally, the outer walls of the end of its inlet pipe and, internally, by a cone that fits in this end of the pipe. The means for giving some degree of spiral flow may be on or adjacent the surface of the cone, for example grooves on the surface of the cone. These grooves may be helical, or partly helical. The base of the cone is preferably positioned a short way into its inlet pipe from the end where that pipe merges with the tube. The conical walls of the cone preferably extend out from that inlet pipe across the openings leading from the other inlet pipe or pipes at the inlet end of the mixer tube. With this construction the bulk of the water is fed along its inlet pipe to the cone and then passes around the sides of the cone and along any groove or grooves in the cone. The high pressure in the annular sheet emerging around the cone and in the pipe lending to the cone is selected by appropriate choice of dimensions for the cone and the annular slot. The Coanda effect i.e., the attraction of the sheet to the sides of the cone, which is accentuated by the fact that the other two streams are directed against the sides of the cone, means that little or no mixing occurs between the streams at this stage.

When the entrained streams reach the apex of the cone, the solid surface which has caused the entrainment, as explained above, is no longer present and the turbulent flow increases substantially instantaneously to give a high degree of shear.

According to a second aspect of the present invention, therefore, apparatus is provided which comprises a mixing tube having at least two inlet pipes leading into one end, and an outlet at its other end, and in which there is a cone whose base fits into one of the inlet pipes to define an annular orifice, the cone projecting into the mixing tube and carrying at least one helical groove on its surface.

The high shear mixing provided by the cone may alone be sufficient to give a stable dispersion of an acid soluble product but it is usually preferred that the mixing tube should include means for causing turbulent mixing and/or helical flow along its length. Desirably these further means cause the aqueous stream to travel in a generally helical path, and may comprise baffles arranged along the tube. The baffles may conveniently be arranged in such a manner as to cause reversal of the entrained helical flow along the cone and thus provide a broken or continuous spiral in the opposite direction. Alternatively, the baffles may be provided in the form of a shear helix i.e., a solid member, usually in the form of a sheet, twisted into a helix and cut at right angles to the axis of the helix at intervals along the length of the helix, or more than one such member in end to end relationship. This provides individual baffles and, if the member is of substantially the same width as the diameter of the tube, the baffles extend over the whole tube. Preferably the shear helix, which is usually made of metal although it may be, for example, of a plastics material, extends substantially throughout the length of the mixing tube, although a section thereof may be uncut in order to provide a section in which the liquid streams are entrained but not subjected to a high degree of mixing.

The cutting and twisting of the sheet means that each baffle is at an angle to a plane through the axis of the tube. It is this angle which causes the aqueous streams to be diverted from a straight path up the tube and to follow a generally helical path. The incidence of the aqueous streams on the angled baffles can approximate near to the effect achieved by the provision of rotor blades at an angle to the vertical in the apparatus used in the process of U.S. Pat. No. 3,963,640. In fact we have found that a desirable product can be prepared in this invention simply by the provision of a shear helix in the mixing tube, without the need for a cone of the type described above, although generally both cone and shear helix are used.

The length of the mixing tube will generally be chosen such that the average pressure drop along the tube is at least 4 psi per inch. When a cone is used at the water inlet, the pressure drop along the cone will be substantially greater than along the rest of the tube. The length of the tube is usually at least 15 or 20 cm and usually less than 50 cm, and it may be, for example, 28 or 30 cm long. The diameter of the mixing tube is generally at least 5 mm but preferably less than 20 mm and is preferably between 8 and 12 mm. The diameters of the inlet pipes will generally vary between 5 and 20, preferably 5 to 10, mm for the main inlet pipe through which the bulk of the water is supplied to the tube, and from 2 to 10, preferably between 2 and 6 mm for the other pipe or pipes.

It is found desirable to observe a relationship between silicate content and pH such that at lower silicate contents the lower pH values are used and at higher silicate contents the higher values are used. Suitable ranges of pH values to obtain a product with optimum properties are set out in Table I, and in Table II the preferred out values, at different silicate contents, are given. Naturally values for silica concentrations not quoted in the Tables can be obtained by interpolation.

TABLE I

| % silicate (as $SiO_2$) | pH range |
|---|---|
| 0.5 | 3–4.2 |
| 1.0 | 3–4.3 |
| 1.5 | 3.2–4.5 |
| 2.0 | 3.4–4.6 |
| 3.0 | 3.7–4.9 |
| 4.0 | 4.3–5.4 |
| 5.0 | 5.5–7.5 |

TABLE II

| % silicate (as $SiO_2$) | optimum pH |
|---|---|
| 0.5 | 3.6 |
| 1.0 | 3.7 |
| 1.5 | 3.8 |
| 2.0 | 4.0 |
| 3.0 | 4.3 |
| 4.0 | 4.9 |

TABLE II-continued

| % silicate (as SiO$_2$) | optimum pH |
|---|---|
| 5.0 | 6.5 |

The aluminium salt is normally the sulphate, but other aluminium salts, such as, for example, alums and aluminium nitrate, can also be used. Commercially available aluminium sulphate may be used, but it is of course desirable that this should not be too contaminated with acid.

The silicate is usually sodium silicate and normally is initially obtained as a concentrated aqueous solution that has a very high pH, for example 12 to 13, and the amount of water used in the process is usually such that, in the absence of the aluminium sulphate or other salt, the pH of the diluted solution of sodium silicate would be below 11·6 and most preferably below 11·3. Potassium silicate can be used instead of sodium silicate.

The amount of water fed to the apparatus, by volume, is normally very large compared with the amount of sodium silicate and aluminium sulphate. For example, the volume of water is normally at least 20 times the volume of sodium silicate, measured as a concentrated aqueous solution, and usually is at least 40 times the volume of the silicate solution. If insufficient water is present the product is more concentrated than is desired, although, as described above, the water introduced through an hydraulic ejector at the outlet of the apparatus may provide the necessary dilution. Usually the bulk of the water supplied through the main inlet to the apparatus is free of both sodium silicate and aluminium sulphate. Thus, in general, the concentrations and relative rates of flow of the aqueous streams supplied to the mixing tube will be the same as described in U.S. Pat. No. 3,963,640.

The invention will now be described with reference to the accompanying drawings in which:

FIG. 2 is a section through another embodiment;

FIG. 3 is a section along the axis X — X of FIG. 2; and

Figure 1:
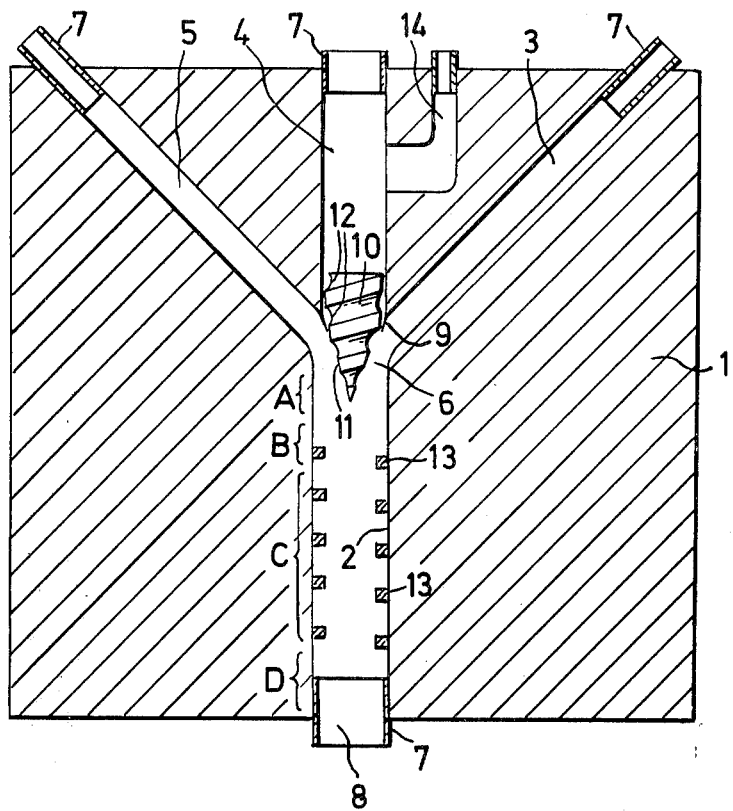
FIG. 1 is a section through one embodiment of the apparatus of this invention.
Figures 4, 5, 6, 7, 8:
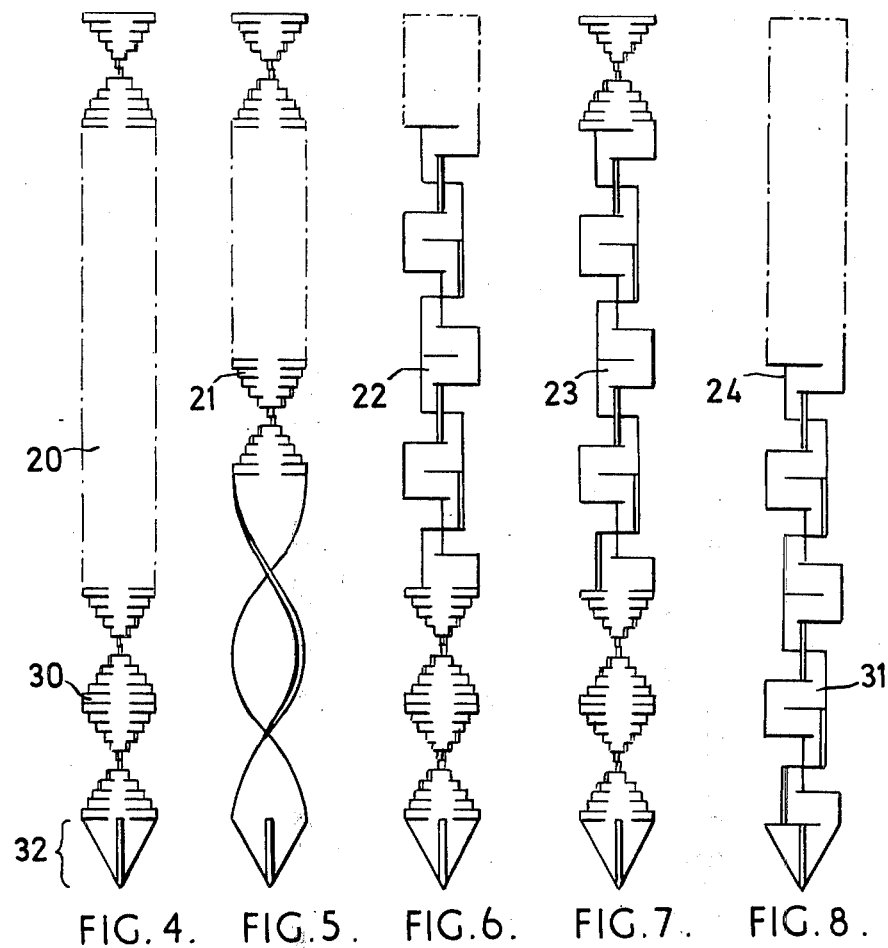
FIGS. 4 to 8 are representations of shear helices suitable for use in the apparatus shown in FIGS. 2 and 3.

The apparatus that is illustrated in FIG. 1 comprises a block 1 of plastic material, usually a clear plastic, a mixing tube 2 and inlet pipes 3, 4 and 5 that merge together to a single inlet 6. Adaptors 7 may be fitted in the outlet 8 from the mixing tube and at the points of entry to the inlet pipes to permit the connection of suitable ducting to feed the liquids to the apparatus and to discharge the product from the apparatus.

Often the outlet 8 discharges direct into the liquid being treated, with the result that the pressure in the tube is then substantially atmospheric and no adaptor 7 is required at the outlet.

At the point where the inlet pipe 4 approaches the common inlet 6 the pipe is itself machined as shown at 9 to provide a seat for a cone 10 which is positioned at the end of this pipe to define an annular orifice. The sides 11 of the cone extend through the common inlet 6 a sufficient distance that streams of sodium (or potassium) silicate from the pipe 3 and aluminium sulphate from pipe 5 come under the influence of the high pressure annular sheet of water forced around the sides of the cone. Due to the grooves the sheet has spiral motion. The pressure prevailing then drops substantially immediately to that prevailing in the rest of the mixing tube, e.g. atmospheric to 20 p.s.i., which resultant high hydraulic shear in the zone marked A.

The product then comes up against a continuous spiral baffle 13 which is positioned to reverse any direction of rotation the sheet may have had, as a result of which high turbulent mixing occurs in zone B. Very thorough mixing continues through zones C and D and finally the product emerges from outlet 8, all within a fraction of a second. Optimum length of the zones B, C and D will readily be found by experiment and will depend upon, for example, flow rates and diameters. Usually zone B is very close to the inlet 6, the uppermost part of the spiral 13 being from 0.1 to 2 centimeters from the lowermost point at which pipes 3 and 5 merge with the cylindrical walls of tube 2.

In a typical apparatus the diameter of the cone, and therefore substantially the diameter of the inlet pipe 4, may be about two-thirds of the height of the cone and may be about twice the diameter of the inlet pipes 3 and 5. For example inlet pipes 3 and 5 may be about 6 mm. diameter, inlet pipe 4 may be about 12 mm. diameter and the cone may be about 18 mm. long. The spiral 13 may extend over, for example, 5 to 10 centimeters and the zone D may be from 1 to 10 centimeters. Typical dimensions of the block may be, for example, 30 centimeters high, 15 centimeters wide and 5 centimeters deep.

In use a high-pressure water stream, usually at a pressure above 100 p.s.i., is introduced through inlet pipe 4 while sodium silicate is introduced to pipe 5 and aluminium sulphate solution through pipe 3. The flow-rates and concentrations, and therefore the pH values, should all be selected as described in U.S. Pat. No. 3,963,640. As an example, if the product is to be used to treat 25 million gallons per day at a dosage of 2 ppm measured as SiO$_2$ and is to have a concentration of 2% measured as SiO$_2$ the flow of water through pipe 4 could be about 100 gallons per hour while if the dosage was 4 ppm and was to treat 100 million gallons per day the flow of water could be 800 gallons per hour.

The product obtained by the process can be very similar to the product obtained by the process described in U.S. Pat. No. 3,963,640 although in some instances the degree of polyermisation may be reduced. However it is necessary that, for example, the zone C should not be so long that the degree of polymerisation at the particular pH and concentration values being used in any particular experiment is reduced so far that the dispersion becomes unstable.

The product obtained by using the apparatus of the invention is of course soluble in hydrochloric acid and it is desirable that the apparatus should include means for washing it with hydrochloric acid. Conveniently this means comprises a feed for hydrochloric acid to the water-inlet pipe at a position on the feed side of the mixing cone. In the apparatus illustrated a feed pipe 14 is provided for this purpose.

The apparatus can be constructed from any suitable material. As indicated it is preferably made of plastic but all or part of it, for example, the spiral 13 or the cone 10, may be of a non-corrodable metal.

The apparatus shown in FIGS. 2 and 3 has the same basic components as that shown in FIG. 1. It also comprises cleaning ducts 15, a hydraulic ejector 16 having an inlet 17, an acid inlet 18 and a pressure gauge 19.

In operation of the apparatus, a shear helix such as one of shear helices 20 to 24 shown in FIGS. 4 to 8, respectively is inserted in the mixing tube 2.

Each of the shear helices consists essentially of a sheet of metal twisted to form a helix. Thus in shear helix 23 there are seven complete turns of the sheet. At the base of each shear helix is a section 32 which is not in fact twisted but the metal has an X-shaped cross-section. This portion fits into the inlet end 6 of the mixing tube and it is in this section that the streams are initially entrained.

In each of shear helices 20, 21, 22, 23 and 24 the twisted sheet is cut perpendicular to the axis of the helix to provide vanes which are such as to ensure that there is both mixing of the streams and helical motion. The sheets are cut before twisting and the vanes slant away from the axis of flow and thus cause some turbulence, although their orientation is such as to ensure helical motion and some entrainment of the streams with each other. Shear helix 21 is unslotted for two complete turns of the helix and thus the required change in degree of turbulence will not occur until the streams have passed this section.

The two types of vanes in the shear helices i.e., narrow and broad vanes, are shown respectively as 30 in helix 20 and 31 in helix 24. The narrow vanes 30 are provided by slotting the metal sheet at regular narrow intervals to a distance between, say, ¼ and ½ of the width of the sheet. The broad vanes 31 are provided by slotting the sheet at wider intervals to a distance greater than ½ the width of the sheet. It is of course preferred that the vanes are wider when the depth of cutting is deeper since otherwise the vanes are too narrow and long to provide the desired degree of resistance to the flow and thus provide the desired turbulence.

In an Example of the use of this type of apparatus, the mixing tube is 30 cm long and 2.5 cm in diameter, into which a shear helix of type 21 is inserted to provide a snug fit. As before, the flow rates, concentrations and pH values should all be selected as described in U.S. Pat. No. 3,963,640 and the product is similar to that obtained in use of the apparatus of FIG. 1.

With both types of apparatus, the inlet pipes for the sodium silicate and aluminium sulphate solutions are conveniently connected to the apparatus through proportionating pumps that control the rate of flow, the water may be fed to the apparatus through any convenient control mechanism, and there may be a timer between the hydrochloric acid store and the hydrochloric acid inlet to permit washing at predetermined intervals. A suitable control mechanism for the water flow is through a Flostat and incorporates a solenoid valve which induces the acid wash flow after a predetermined time.

The product may be collected in containers, for example barrels, and subsequently shipped to its point of use but as the concentration of the product, measured as $SiO_2$, is normally below 5% and often is very low, it is usually more convenient to discharge the product either direct into the sewage or other aqueous suspension. The product obtained by use of the apparatus described is adequate to serve as a partial coagulant aid and has floc weighting properties. It can be used on any industrial effluent treatment process requiring rapid sedimentation of suspended particles especially when the volume of water to be treated is relatively small and the final quality is to be suitable for normal disposal purposes. The process is also of great value in sewage effluent treatment where large volumes are to be treated by clarification and sedimentation processes only before or after sludge digestion. It is easily possible so to design the apparatus that it can be used to produce sufficient coagulant aid to dose up to 25 million gallons of water per day, or even up to 100 million gallons of water per day.

What we claim is:

1. A process in which a stable aqueous dispersion of a complex alkali metal-aluminium-silicate having a pH of 3 to 7.5, which contains up to 5% silicate, measured as $SiO_2$, and which is soluble in hydrochloric acid, is prepared by mixing an aqueous solution of alkali metal silicate and an aqueous solution of an aluminium salt in apparatus comprising a mixing tube, at least two inlets through which aqueous streams can pass into one end of the tube, and an outlet at the other end of the tube, the process being characterised in that the bulk of the water is supplied to the tube through a first said inlet, the aqueous solution of alkali metal silicate is supplied through a second said inlet, and the aqueous solution of an aluminium salt is supplied either through said first inlet or a third said inlet, the aqueous streams from each inlet are constrained to pass in a generally helical path along the tube by stationary means positioned in the tube, and the aqueous dispersion is removed through the outlet at a pressure which is at least 40 psi lower than the pressure at the inlet through which the bulk of the water is supplied.

2. A process according to claim 1 in which the pressure drop along the tube is at least 60 psi.

3. A process according to claim 1 in which the apparatus comprises an hydraulic ejector at the outlet, and the aqueous dispersion is removed through the outlet into a vacuum of at least 10 in. Hg.

4. A process according to claim 1 in which the average pressure drop along the tube is at least 4 psi per inch.

5. A process according to claim 1 in which the apparatus comprises three inlets, one of which has a common axis with the mixing tube and through which the bulk of the water is supplied, and aqueous solutions of sodium silicate and aluminium sulphate are supplied separately through the other two inlets.

6. A process according to claim 5 in which the other two inlets are at an angle of more than 120° to the tube.

7. A process according to claim 1 in which the inlet through which the bulk of the water is supplied terminates in a slot-shaped orifice through which a sheet of liquid is discharged.

8. A process according to claim 7 in which the orifice is annular and defined by, externally, the outer walls of the inlet and, internally, by a cone that fits in this end and projects into the mixing tube.

9. A process according to claim 8 in which there is at least one helical groove on the surface of the cone.

10. A process according to claim 1 in which there are baffles along the length of the tube to constraim the aqueous streams to pass in a generally helical path.

11. A process according to claim 10 in which the baffles are in the form of a shear helix.

12. A process according to claim 1 in which the silicate content and the pH of the product are in accordance with the following relationship

| & silicate (as SiO$_2$) | pH range |
|---|---|
| 0.5 | 3–4.2 |
| 1.0 | 3–4.3 |
| 1.5 | 3.2–4.5 |

-continued

| & silicate (as SiO$_2$) | pH range |
|---|---|
| 2.0 | 3.4–4.6 |
| 3.0 | 3.7–4.9 |
| 4.0 | 4.3–5.4 |
| 5.0 | 5.5–7.5 |

* * * * *